No. 768,236. PATENTED AUG. 23, 1904.
H. PRATT.
APPARATUS FOR DIVIDING CARCASSES OF HOGS OR OTHER ANIMALS.
APPLICATION FILED MAY 4, 1904.
NO MODEL. 2 SHEETS—SHEET 2.
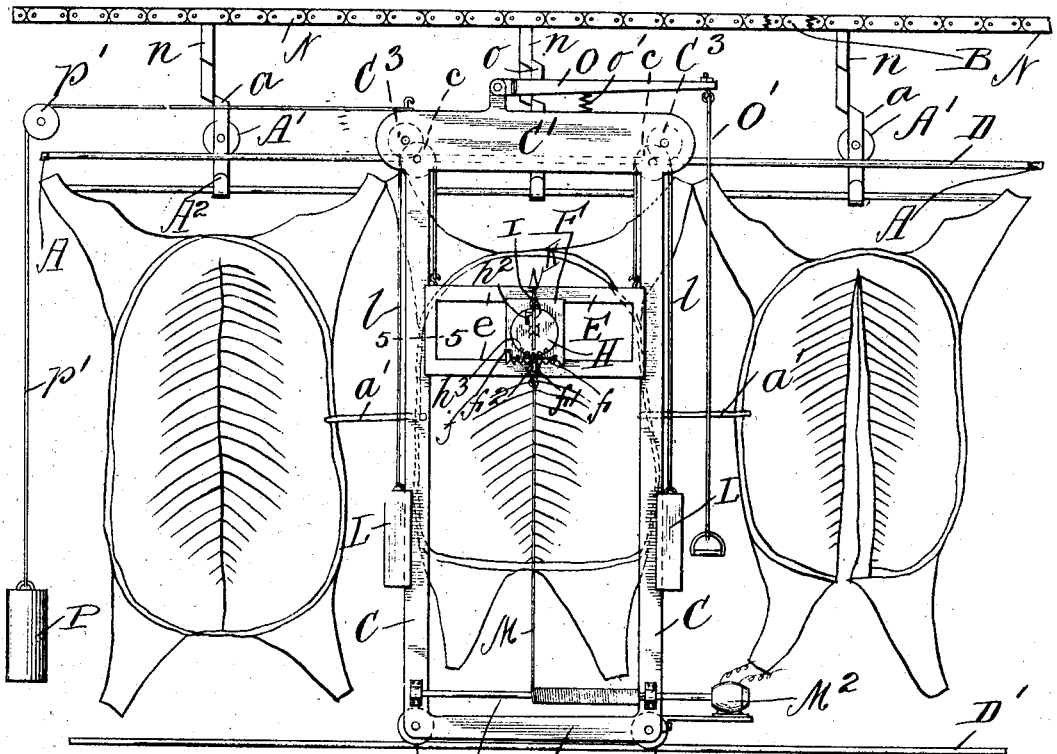
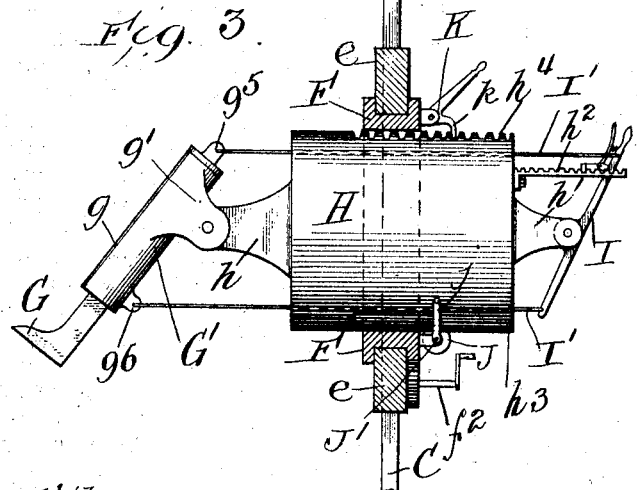
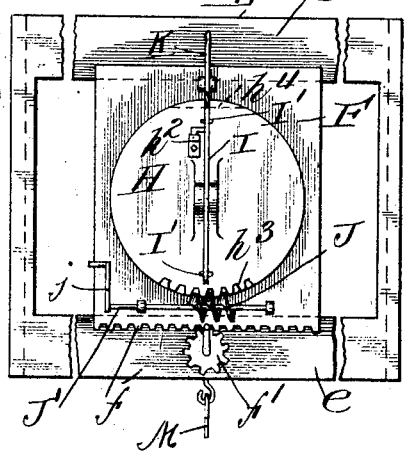
Witnesses:
Ray White
Harry White
Inventor:
Harry Pratt,
By Poole & Brown Attys.

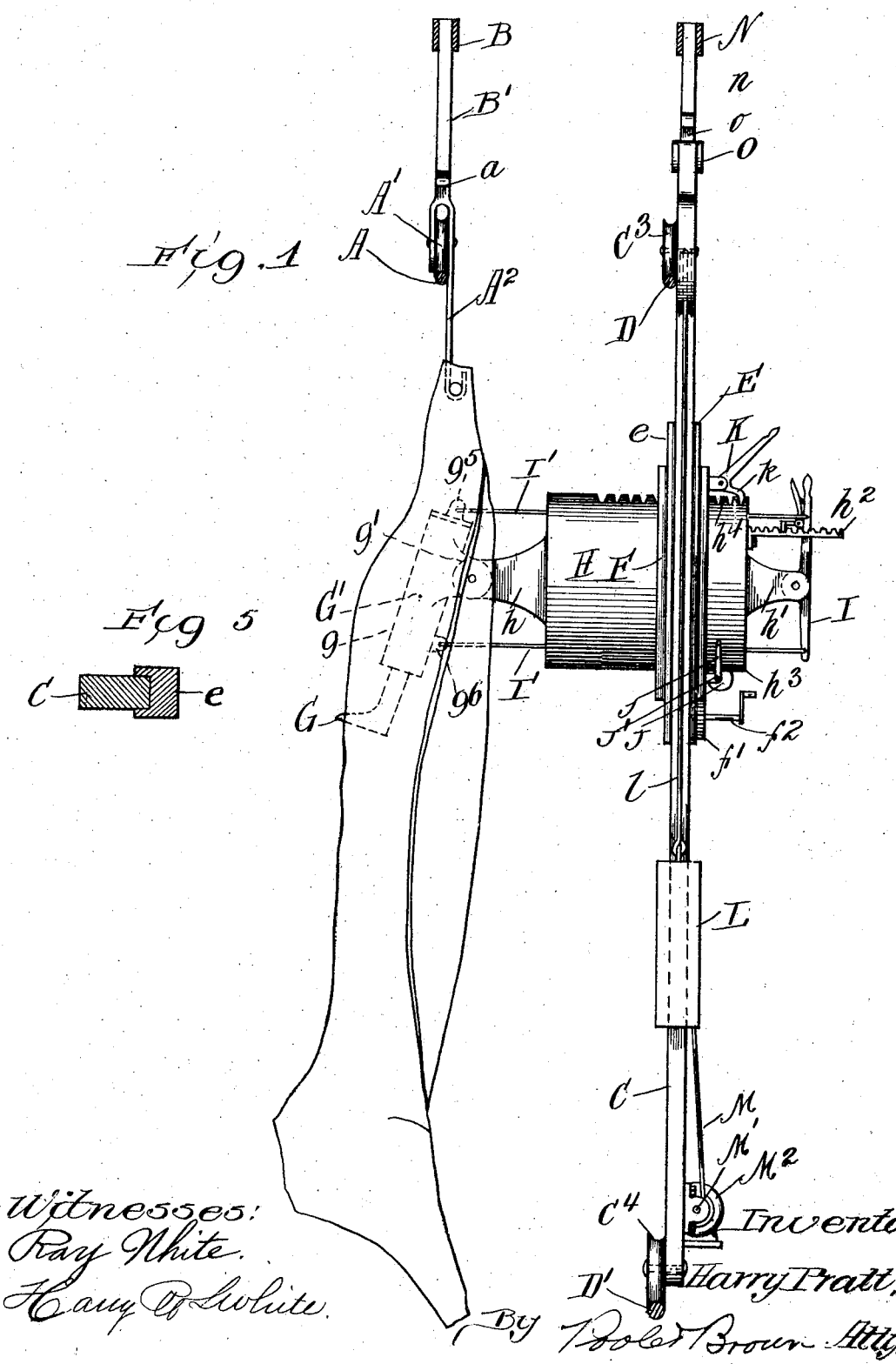

No. 768,236. Patented August 23, 1904.

UNITED STATES PATENT OFFICE.

HARRY PRATT, OF KENILWORTH, ILLINOIS.

APPARATUS FOR DIVIDING CARCASSES OF HOGS OR OTHER ANIMALS.

SPECIFICATION forming part of Letters Patent No. 768,236, dated August 23, 1904.

Application filed May 4, 1904. Serial No. 206,372. (No model.)

*To all whom it may concern:*

Be it known that I, HARRY PRATT, a citizen of the United States, and a resident of Kenilworth, in the county of Cook and State of Illinois, have invented certain new and useful Improvements in Apparatus for Dividing the Carcasses of Hogs or other Animals; and I do hereby declare that the following is a full, clear, and exact description thereof, reference being had to the accompanying drawings, and to the letters of reference marked thereon, which form a part of this specification.

This invention relates to an apparatus for cutting or dividing in two parts or halves the carcasses of hogs, sheep, and like animals during the process of butchering; and the invention consists in the matters hereinafter set forth, and more particularly pointed out in the appended claims.

An apparatus embodying my invention embraces in general terms, in combination with the usual continuously-traveling trolley apparatus for carrying the carcasses of the animals from place to place in the slaughter-house, (the carcass being separated or divided while in transit,) a frame carrying a knife or cleaver and constructed to travel a limited distance with the carcasses in such relation thereto that while the frame is traveling with a carcass the cleaver acts thereon to cut or divide the same in two parts along the backbone or spine of the carcass. After a particular carcass has been divided the carrying-frame and the cutting or cleaving mechanism are retracted and arrested in front of another carcass, and thereafter the frame and cutter travel with the other carcass and cut or divide the same while traveling therewith, and in this manner the frame travels in its limited range backward and forwardly and while traveling with the carcass cuts or divides the same. The carcasses are thus advanced continuously in their line of movement while the movable cutting mechanism moves therewith at an equal speed in its limited range of advance and when the limit of such range has been reached is retracted and stopped opposite to the next carcass to be cut or divided and thereafter travels with the latter carcass until the cutting operation is completed. Means are provided for accurately registering the cutting or cleaving knife with the different carcasses, so as to insure the division thereof along the proper lines notwithstanding deviations of the anatomical proportions of the carcasses or of their positions.

Referring to the drawings, Figure 1 is a transverse section taken through a carcass trolley or carrying apparatus and showing in edge elevation my improved cutting apparatus and supporting devices or tracks therefor. Fig. 2 is a front view of the parts shown in Fig. 1. Fig. 3 is a detail illustrating the manner of supporting, operating, and adjusting the cutting-knife. Fig. 4 is a front elevation of the parts shown in Fig. 3. Fig. 5 is a cross-section taken on line 5 5 of Fig. 2.

As shown in the drawings, A designates a horizontal trolley-wire, and A' designates a trolley-wheel traveling thereon provided with a hanger A², which supports centrally a hanging-stick A³, upon which the carcass is supported in a familiar manner. A number of the hangers are employed in connection with a single track or wire A, so that the carcasses follow each other in close succession. The hangers and carcasses are carried forwardly on said trolley-wire through the medium of a traveling chain belt B, having a plurality of downwardly-projecting arms B', which are adapted for contact with lugs $a$, extending upwardly from the hangers A². The chain B is of course an endless chain; but only one lap is herein shown. Said chain travels slowly and continuously and advances the carcasses suspended from the hangers at a uniform continuous speed. The carcasses are held separated by means of short distance-sticks $a'$. (Shown in Fig. 2.)

Referring now to the cutting or cleaving knife and the frame for supporting the same, these parts are made as follows: Said frame consists generally of two upright members C C and top and bottom members C' C², respectively. It travels on upper or lower tracks or wires D D', extending parallel with the trolley-wire A, the upper member of the frame being provided with wheels C³, which travel on said upper wire or rail D, and the lower frame being provided with other wheels $C^4$, which travel on the lower rail or wire $D'$. The frame is located in front of the path of movement of the carcasses. Supported on said frame is a carriage E, which extends between and has guiding engagement with the upright side members C of the frame, whereby the carriage is free to move upwardly and downwardly on the frame. Said carriage is formed with a transverse opening, within which is movably mounted a knife-carrier consisting of a transversely-adjustable block F and a rotative cylinder H, which latter carries the knife G. The block has guiding engagement at its upper and lower sides with the upper and lower transverse members $e$ of the carriage. Said block F is adjusted longitudinally of the carriage or transversely of the supporting-frame by means of a rack $f$ on the lower edge of the block, which is engaged by a pinion $f'$, affixed to a rotative shaft $f^2$, which has suitable bearings in the block. The knife G may be made of any peculiar form desired and is reciprocated by being attached in any suitable manner to a piston-rod $g$, which is attached to a piston $g'$, (shown in dotted lines in Fig. 3,) that reciprocates in a cylinder $G'$, which is pivotally mounted on a lug $h$ at the forward end of the cylinder H. The said cylinder $G'$ may be the cylinder of a pneumatically-operated machine or may be a steam-cylinder. Inasmuch as this feature constitutes no part of my invention, it is merely indicated rather than illustrated in detail. The angle of said actuating cylinder for the knife is adapted to be varied (which is permitted by reason of its hinged connection with the cylinder H) through the medium of a lever I, that is pivoted between its ends to a lug $h'$, extending rearwardly from the cylinder H, and parallel rods or cables $I'$ $I'$, attached at their rear ends to the upper and lower ends of said lever I and at their forward ends to lugs $g^5$ $g^6$ on the knife-actuating cylinder. The said lever is locked in an adjusted position by means of a spring-latch $i$, which engages the teeth of a ratchet-bar $h^2$, projecting rearwardly from the supporting-cylinder H. The cylinder H has a limited rotation in the block F to vary the angle of the cutting-knife relatively to the axis of said cylinder. Said rotation is effected in the present instance by means of a worm J, which is adapted to engage teeth $h^3$ on the lower face of the cylinder H in the manner clearly shown in Fig. 4. Said worm is formed on a shaft $J'$, having a crank $j$, by which it is rotated. The worm-adjusting device constitutes also a locking device to lock the knife in any given adjustment. Said supporting-cylinder is also movable forwardly and rearwardly in its block F and is locked in place by means of a gravity pawl or latch K, which is pivoted to the block in the manner shown in Fig. 3 and is provided with a lug $k$, adapted to enter notches $h^4$ in the upper cylindric surface of said cylinder, as shown in Fig. 3. The adjustments described enable the knife to be accurately adjusted to a carcass notwithstanding the fact that the carcasses may be presented to the cutting mechanism out of proper line with the cutting-knife.

In the apparatus herein illustrated the cutting operation begins at the lower end of the carcass, and the carriage E and knife G are moved upwardly as the cutting operation proceeds. The devices for moving the carriage vertically on its frame to effect this result are made as follows: L L designate two weights, one on each side of the frame and provided with cables $l$, which are trained over pulleys $c$ (shown in dotted lines in Fig. 2) and are attached at their other ends to the upper sides of the opposite ends of the carriage E. The weights therefore tend to move the carriage upwardly. The carriage is moved downwardly to its starting position to bring the knife to the lower end of the carcass by means of a cable M, which is wound about a rotative shaft $M'$ and is attached at its free end to the lower side of the carriage. Said shaft $M'$ is rotated in any suitable manner, as by means of an electric motor $M^2$, carried by the frame. The operation of this part of the device is as follows: The carriage is moved downwardly against the action of the weights L by rotation of said shaft $M'$. Thereafter the shaft $M'$ is released and the carriage, together with the cutting-knife, is carried upwardly by the weights L, with the knife in cutting engagement with the carcass, and therefore retarding somewhat the movement of the carriage. Said knife during its upward movement is reciprocated, and the reciprocation of the knife and the upward travel of the carriage is continued until the carcass is almost severed or divided. Thereafter the shaft is rotated to retract the carriage and knife to bring it in position to operate upon another carcass.

The frame is caused to move forwardly on its track $D D'$ by means of an endless chain or belt N, which travels parallel with a belt B and is provided with downwardly-projecting arms $n$, which are adapted to engage a lug $o$, carried by a swinging lever O, which is pivoted at one end to the upper member of the frame and is held in its normal position with its outer end raised by means of a spring $o'$. The chain or belt N need be made only slightly longer than the range of travel of the cutting-knife and its supporting-frame, inasmuch as it gives motion to the frame only during the time the cutting operation is taking place. The belt N travels at an equal speed with the belt B. In the travel of the chain N when one of the arms $n$ engages the lug $o$ in the manner described it carries forwardly the frame and cutting-knife, and said parts travel with the carcass until the cutting operation is finished. When the cutting operation has ceased, the knife-carrying frame is released by depressing the free end of the lever O to free the lug $o$ from one of the chain-arms $n$. Such depression of the lever is accomplished in this instance by means of a rod or cable O', attached to the outer or free end of the lever and provided with a handle $o^2$ at its lower end, as shown in Fig. 2. The frame travels with the carcass a sufficient length of time for the knife to almost wholly sever or divide the carcass and thereafter is released through the medium of the lever described and is retracted or drawn backwardly until arrested by contact of the lug $o$ with one of the arms $n$ of its carrying-chain. The frame is adapted to be quickly retracted, which may be accomplished in any suitable manner. As herein shown, it is returned by means of a weight P, attached to one end of a cable $p$ and trained over a pulley $p'$ and attached at its other end to the upper part of the knife-carrying frame. It will be observed that the arms $n$ and B' of the two carrying-chains B N are in register or opposite each other, so that the frame is brought to rest opposite a carcass which is supported on one of the hangers. In some cases imperfections in the anatomy of the carcass or the manner in which it is suspended by the hanger may necessitate the adjustment of the knife by either of the adjusting devices described to the end that the cut or line of severance shall be parallel with the backbone or spine of the animal.

It is obvious that many of the structural details of my device may be varied without departing from the spirit of my invention, and I do not wish to be limited thereto except as hereinafter made the subject of specific claims.

I claim as my invention—

1. The combination with a conveyer for a carcass and a cutting-knife, of a support for the knife, a track in front of and parallel with the carcass-conveyer, means for advancing said knife-support on said track, and means for moving said knife vertically during its advance movement.

2. An apparatus for the purpose set forth comprising, in combination with a continuously-moving conveyer for the carcasses, a cutting mechanism for dividing or severing the carcasses, comprising a cutting-knife, a support therefor, a track located in front of and parallel with the conveyer, means for imparting a limited advance movement to said support on said track, and in the same direction as the travel of said conveyer whereby the knife advances for short intervals with each carcass in cutting relation thereto, means for retracting said support to its starting-point at the end of each advance movement, and means for moving the knife vertically while it is advancing.

3. An apparatus for the purpose set forth comprising, in combination with a continuously-moving conveyer for the carcasses, a cutting mechanism for dividing or severing the carcasses, comprising a cutting-knife, a support therefor, a track located in front of and parallel with the conveyer, means for imparting a limited advance movement to said support on said track, and in the same direction as the travel of said conveyer, whereby the knife advances for short intervals with each carcass in cutting relation thereto, means for retracting said support to its starting-point at the end of each advance movement, means for moving the knife vertically while it is advancing, and means for adjusting said knife toward and from its support.

4. An apparatus for the purpose set forth comprising, in combination with a continuously-moving conveyer for the carcasses, a cutting mechanism for dividing or severing the carcasses, comprising a cutting-knife, a support therefor, a track located in front of and parallel with the conveyer, means for imparting a limited advance movement to said support on said track, and in the same direction as the travel of said conveyer, whereby the knife advances for short intervals with each carcass in cutting relation thereto, means for retracting said support to its starting-point at the end of each advance movement, means for moving the knife vertically while it is advancing, and means for adjusting the cutting-knife laterally relatively to its support.

5. An apparatus for the purpose set forth comprising, in combination with a continuously-moving conveyer for the carcasses, a cutting mechanism for dividing or severing the carcasses, comprising a cutting-knife, a support therefor, a track located in front of and parallel with the conveyer, means for imparting a limited advance movement to said support on said track, and in the same direction as the travel of said conveyer, whereby the knife advances for short intervals with each carcass in cutting relation thereto, means for retracting said support to its starting-point at the end of each advance movement, means for moving the knife vertically while it is advancing, and means for changing the angle of said knife relatively to its support.

6. An apparatus for the purpose set forth comprising, in combination with a continuously-traveling conveyer for the carcasses, a frame which has a limited range of travel in front of and parallel with the line of movement of said conveyer, a cutting-knife carried by said frame and vertically movable therein, mechanism for advancing the frame with the conveyer while the knife is operating on a carcass to cut the same, a tripping mechanism for releasing the frame from its advancing mechanism, and means for quickly retracting the frame to bring it opposite the next carcass to be cut after said release.

7. An apparatus for the purpose set forth, comprising, in combination with a continuously-moving conveyer, a frame, a track in front of and parallel with said conveyer, means for advancing said conveyer on said track, a carriage in said frame which is movable vertically therein, a knife carried by the carriage and adapted to cut or sever the carcasses, means for moving said carriage downwardly to bring the knife to the lower end of a carcass and means for moving the carriage upwardly to bring the knife into cutting relation with the carcass from the lower to the upper end thereof.

8. An apparatus for the purpose set forth comprising, in combination with a continuously-moving conveyer for the carcass, a frame, a track in front of and parallel with said conveyer, means for advancing said frame on said track, a carriage which has vertical movement in said frame, a knife carried by the carriage, means for lowering said carriage in the frame, comprising a rotative shaft, a cable wound about the shaft and attached to the carriage, and means for raising said carriage while the knife is in cutting engagement with the carcass comprising a weight or weights which exert an upward pull on the carriage.

9. An apparatus for the purpose set forth comprising, in combination with a continuously-moving conveyer for the carcasses, a frame, a track in front of and parallel with the conveyer, means for imparting a limited advance movement to the frame on said track, means for retracting said frame at the end of its travel and for bringing it opposite to another carcass on the conveyer, a carriage on said frame which is movable vertically therein, a cutting-knife support in said carriage, a cutting-knife carried by said support, and means for moving said support at varying distances toward and from the plane of the frame and locking it in an adjusted position.

10. An apparatus for the purpose set forth comprising, in combination with a continuously-moving conveyer for the carcasses, a frame, a track located in front of and parallel with the conveyer, means for imparting a limited advance movement to said frame on said track, means for retracting said frame at the end of its travel and for bringing it opposite to a carcass on the conveyer, a carriage in said frame which is movable vertically therein, a cutting-knife support in said carriage, a cutting-knife and its actuating mechanism pivotally mounted on said support, and means for varying the angle of the knife and its actuating mechanism relatively to its support.

11. An apparatus for the purpose set forth comprising, in combination with a continuously-moving conveyer for the carcasses, a frame, a track located in front of and parallel with said conveyer, means for giving a limited advance movement to said frame on said track, means for retracting the frame after it has reached the limit of its range of movement and arresting it opposite to a carcass on the conveyer, a carriage movable vertically in said frame, a cutting-knife, a cylindric support for the knife rotatively mounted in said carriage, and means for angularly adjusting said support.

12. An apparatus for the purpose set forth comprising, in combination with a continuously-moving conveyer for the carcasses, a frame, a track located in front of and parallel with said conveyer, means for imparting a limited advance movement to said frame on said track, means for retracting the frame after it has reached the limit of its range of movement and arresting it opposite to a carcass on the conveyer, a carriage movable vertically in said frame, a cutting-knife, a cylindric support for the knife rotatively mounted in said carriage, and means for angularly adjusting said support comprising a worm-wheel supported on the carriage and engaging a series of teeth on the cylindric support.

In testimony that I claim the foregoing as my invention I affix my signature, in presence of two witnesses, this 26th day of April, A. D. 1904.

HARRY PRATT.

Witnesses:
WILLIAM L. HALL,
GERTRUDE BRYCE.